A. F. KEETER.
CORN PLANTER.
APPLICATION FILED NOV. 25, 1910.

1,014,064.

Patented Jan. 9, 1912.

Witnesses

A. F. Keeter,
Inventor
by C. A. Snow & Co.
Attorneys

UNITED STATES PATENT OFFICE.

ANDREW F. KEETER, OF CATOOSA, OKLAHOMA.

CORN-PLANTER.

1,014,064. Specification of Letters Patent. Patented Jan. 9, 1912.

Application filed November 25, 1910. Serial No. 594,100.

*To all whom it may concern:*

Be it known that I, ANDREW F. KEETER, a citizen of the United States, residing at Catoosa, in the county of Rogers and State of Oklahoma, have invented a new and useful Corn-Planter, of which the following is a specification.

This invention has relation to planters of that type generally known as wireless check rowers and consists in the novel construction and arrangement of its parts as hereinafter shown and described.

The object of the invention is to provide a planter of simple structure the parts of which may be readily manipulated in order that the proper check row alinement may be maintained during the planting operation and with this object in view, the planter includes hill markers of peculiar construction arranged to be manipulated to make imprints in the top soil, adjacent the points at which the hills are planted, and by using such indicating marks the proper check row alinement as above set forth may be maintained.

Figure 1:
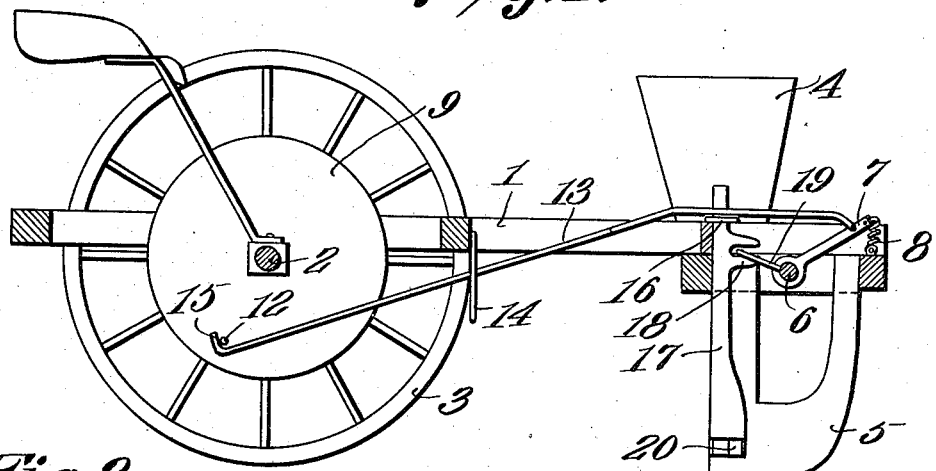
Figure 2:
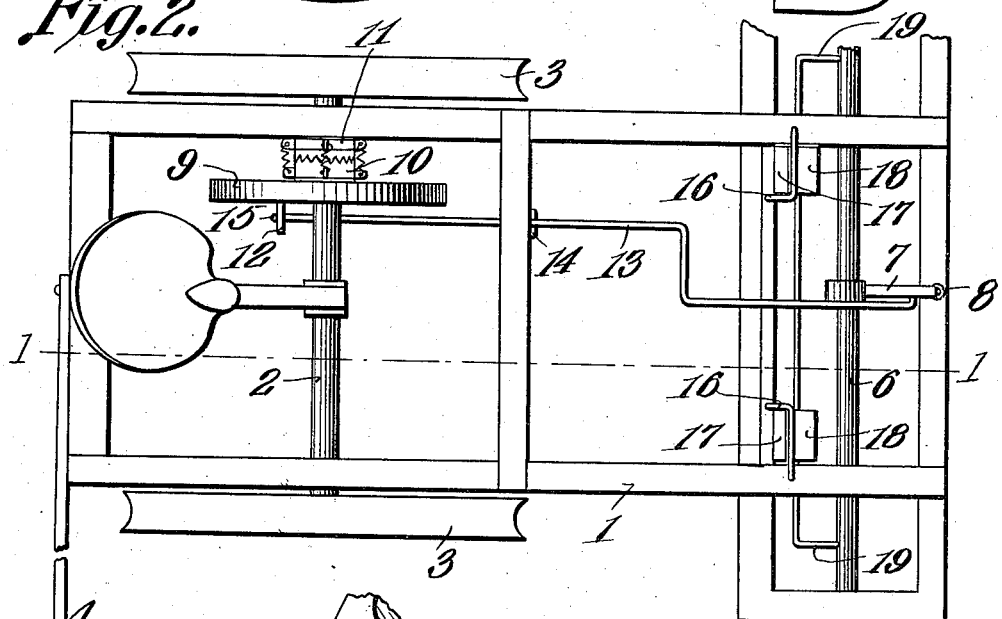
Figure 3:
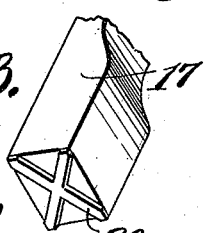

In the accompanying drawing, Figure 1 is a longitudinal sectional view of the planter cut on the line 1—1 of Fig. 2. Fig. 2 is a top plan view of the planter. Fig. 3 is a perspective view of the lower end portion of one of the hill markers.

The planter consists of a frame 1 which is supported upon an axle 2 which in turn is mounted upon traction wheels 3. The planter is provided at the forward portion of the frame 1 with seed boxes 4 of usual pattern and runners or furrow openers 5 also of the ordinary design. A shaft 6 is journaled for rotation at the forward portion of the frame 1 and may be operatively connected with the seed separating and seed dropping devices of the seed boxes 4 and runners 5 in the usual manner. An arm 7 is fixed to the shaft 6 and a traction spring 8 is connected at one end with the outer end portion of the said arm and at its other end with the forward portion of the frame 1. The said spring 8 is under tension with a tendency to draw the outer portion of the arm 7 toward the forward end of the frame in a manner as illustrated in Fig. 1 of the drawing.

A disk 9 is loosely mounted upon the axle 2 and is provided with a clutch hub 10. A clutch member 11 is slidably mounted upon the axle 2 and when the member 11 is in engagement with the clutch hub 10 of the disk 9, the said disk 9 is caused to rotate in unison with the said axle 2. The disk 9 is provided upon one side with an outstanding pin 12. The forward end of a rod 13 is pivotally connected with the outer end portion of the arm 7 and the said rod passes through a guide 14 attached to the frame 1, and the rear end portion of the said rod 13 is upturned as at 15 and lies in the path of movement of the pin 12 carried by the disk 9. Guides 16 are mounted upon the forward portion of the frame 1 and the upper end portions of hill markers 17 are slidably mounted in the guides 16. The markers 17 are adapted to move vertically with relation to the frame 1. The upper end portion of each marker 17 is provided with spaced lugs 18, the said lugs being disposed toward the shaft 6. A U-shaped arm 19 is attached at its ends to the shaft 6 and the intermediate portion of the said arm 19 is disposed toward the markers 17 and lies in the space between the lugs 18 of the said markers. Each marker 17 may be provided at its lower end with a lower character 20 which is adapted to make an imprint in the soil when the marker 17 is forced down against the surface thereof.

From the above description it will be seen that when the clutch member 11 is in engagement with the hub 10 and the planter is passed over a field that rotary movement is transmitted from the axle 2 and the disk 9 and the pin 12 is carried around the axis of the axle 2. When the said pin 12 comes in contact with the upturned rear extremity 15 of the rod 13, the said rod 13 is moved longitudinally which in turn will swing the arm 7 about the axis of the shaft 6 and the said shaft is turned. This turning movement upon the part of the shaft 6 operates the seed operating and dropping mechanisms not shown and at the same time the arm 19 is swung about the axis of the shaft 6 and the markers 17 are caused to descend and the lower end portions 20 thereof are forced in contact with the ground. Inasmuch as the seed separating and dropping mechanisms together with the planting means operate at the same time that the said markers descend the markers will indicate at the surface of the ground the location of the planted hills. When the pin 12 passes beyond the upturned extremity 15 at the end of the rod 13, the said rod is no longer subjected to the moving action of the said pin and the tension of the spring 8 comes into play and draws the arm 7 back toward the forward end of the frame 1 and thus the shaft 6 and its attached and associated parts are returned to their normal position.

Having described the invention, what I claim as new and desire to secure by Letters Patent is:

In combination with a planter having a shaft journaled thereon and operatively connected with the seed separating and dropping mechanisms, guides mounted upon the frame of the planter, markers mounted for vertical sliding movement in said guides, said markers having upon those sides adjacent the shaft spaced lugs, a U-shaped arm connected at each end with the shaft and having its intermediate portion lying in the spaces between the lugs of the said markers, means for partially rotating said shaft in one direction and a return spring operatively connected with said shaft and with the planter frame.

In testimony that I claim the foregoing as my own, I have hereto affixed my signature in the presence of two witnesses.

ANDREW F. KEETER.

Witnesses:
 GUS KEETER,
 JOHNIE HAMILTON.

Copies of this patent may be obtained for five cents each, by addressing the "Commissioner of Patents, Washington, D. C."